United States Patent [19]

Tang

[11] Patent Number: 5,541,890
[45] Date of Patent: Jul. 30, 1996

[54] METHOD FOR PREDICTIVE SIGNAL PROCESSING FOR WIRELINE ACOUSTIC ARRAY LOGGING TOOLS

[75] Inventor: Xiaoming Tang, Sugar Land, Tex.

[73] Assignee: Western Atlas International, Inc., Houston, Tex.

[21] Appl. No.: 437,955

[22] Filed: May 10, 1995

[51] Int. Cl.$^6$ .................................................. G01V 1/40
[52] U.S. Cl. .............................. 367/34; 367/25; 367/73; 364/422
[58] Field of Search .................................. 367/25, 31, 32, 367/34, 73, 28; 364/422; 166/250

[56] References Cited

U.S. PATENT DOCUMENTS

| 210,966 | 7/1980 | Ingram | 367/27 |
|---|---|---|---|
| 4,672,588 | 6/1987 | Willen | 367/28 |
| 4,819,214 | 4/1989 | Gutowski et al. | 367/27 |
| 5,197,038 | 3/1993 | Chang et al. | 367/28 |

*Primary Examiner*—Ian J. Lobo
*Attorney, Agent, or Firm*—Richard A. Fagin

[57] ABSTRACT

A method of determining the acoustic propagation velocity of an earth formation penetrated by a wellbore by processing signals from an array acoustic wellbore logging tool. The tool includes a transmitter and a plurality of receivers axially spaced apart from the transmitter. The method includes the steps of combining signals generated by ones of the receivers in response to acoustic energy propagated through the wellbore from the transmitter, to generate a synthesized signal corresponding to another one of the receivers. The step of combining includes time shifting signals from the ones of the receivers by an amount corresponding to a predetermined velocity for each propagation mode and the axial distance between the ones of receivers and the other receiver. The synthesized signal is compared to the signal generated at the other receiver in response to the acoustic energy to determine a degree of correspondence between the synthesized signal and the received signal. The values of velocity for each propagation mode are varied, a signal is again synthesized and compared to the measured signal, and these steps are repeated until the degree of correspondence reaches a maximum. The values of velocity at which the degree of correspondence is a maximum are determined to be the acoustic propagation velocities of the earth formation for each of the different modes of propagation.

In a preferred embodiment of the invention, the step of comparing includes generating an object function of the difference between the synthesized signal and the received signal. The object function is minimized by the Levenberger-Marquardt algorithm to determine the values of velocity for each propagation mode.

10 Claims, 2 Drawing Sheets

METHOD FOR PREDICTIVE SIGNAL PROCESSING FOR WIRELINE ACOUSTIC ARRAY LOGGING TOOLS

BACKGROUND OF THE INVENTION

1. Field of the Invention

The present invention is related to the field of acoustic array wellbore logging instruments. More specifically, the present invention is related to methods of processing receiver signals from an acoustic array wellbore logging instrument in order to determine acoustic energy transmission properties of earth formations penetrated by a wellbore.

2. Discussion of the Related Art

Acoustic array wellbore logging tools are known in the art for determining acoustic properties of earth formations penetrated by a wellbore. The array acoustic wellbore logging tools known in the art typically include an energy emitting transducer, called a transmitter, and a plurality of receiving transducers, called receivers, axially spaced apart from the transmitter along an elongated tool mandrel. The tool is typically lowered into the wellbore at one end of an armored electrical cable. The transmitter periodically energizes the wellbore with pulses of acoustic energy. The acoustic energy travels through a fluid filling the wellbore and interacts with the interface between the fluid and the wall of the wellbore. Some of the acoustic energy can then travel along the wellbore wall. After travelling along the wall of the wellbore, some of the energy can travel back into the wellbore towards the tool where it can be detected by the receivers. The receivers convert the acoustic energy into electrical signals having amplitudes corresponding to the acoustic energy amplitude.

Tools known in the art can digitize the receiver signals in an electronics unit disposed within the tool mandrel, and can transmit the digitized signals along the electrical cable to processing and recording equipment located at the earth's surface. The properties of interest of various earth formations traversed by the logging tool can be determined by performing various calculations on the digitized signals.

For example, a method which is known in the art for determining acoustic transmission velocity of the formation, the method being called semblance correlation, comprises determining values of time difference between the signals from each of the receivers at which the degree of correspondence between the signals reaches a maximum. The time difference is then used to calculate a formation acoustic velocity since the distances between the receivers are known.

Other methods known in the art for determining formation velocity from the receiver signals include so-called N-th root stacking, which includes digitally summing or stacking predetermined portions of the receiver signals in order to improve the signal-to-noise ratio of the velocity determinations.

A drawback to the methods known in the art for determining formation velocity from receiver signals of an array acoustic logging tool is that the receiver signals can include responses to more than one mode of acoustic energy propagation. Propagation modes are related to the manner in which the particles of the formation move relative to the direction of propagation of the acoustic energy and can include so-called compressional mode, shear or flexural mode and Stoneley modes. Certain acoustic energy propagation modes can have significant overlap in time, making isolation of the desired mode difficult using N-th root stacking or semblance correlation.

It is also known in the art to distinguish one propagation mode form another by filtering the receiver signals with a frequency bandpass filter having a passband corresponding to the frequency content of the desired propagation mode. A drawback to bandpass filtering is that the desired propagation mode may have significant overlap in frequency content with other propagation modes, making difficult the isolation of the desired mode, and subsequent determination of the velocity of that mode. For example, shear propagation mode, in which the acoustic energy propagates substantially perpendicularly to the direction of particle motion, can have different acoustic velocities for different orientations of particle motion in some anisotropic earth formations. A single acoustic signal comprising the two different orientations of shear waves, representing shear propagation at two different velocities, would be difficult to separate into its component modes using bandpass filtering and semblance correlation for determining acoustic velocity, since the frequency content and time span of the two modes would have substantial overlap.

Accordingly, it is an object of the present invention to provide a method of determining the velocity of an acoustic signal propagating in a desired propagation mode from receiver signals of an acoustic array logging tool, which provides improved performance in the event of signals from other propagation modes overlapping the desired mode in time and frequency content.

SUMMARY OF THE INVENTION

The present invention is a method of determining the acoustic propagation velocity of an earth formation penetrated by a wellbore by processing signals from an array acoustic wellbore logging tool. The tool includes a transmitter and a plurality of receivers axially spaced apart from the transmitter. The method includes the steps of combining signals generated by ones of the receivers in response to acoustic energy propagated through the wellbore from the transmitter to generate a synthesized signal corresponding to another one of the receivers. The step of combining includes time shifting signals from the ones of the receivers by an amount corresponding to a predetermined value of velocity for each propagation mode and the axial distance between the ones of receivers and the other receiver. The synthesized signal is compared to the signal generated at the other receiver in response to the acoustic energy to determine a degree of correspondence between the synthesized signal and the measured signal. The values of velocity for each mode are varied, a signal is again synthesized and compared to the actual signal, and these steps are repeated until the degree of correspondence reaches a maximum. The values of velocity at which the degree of correspondence is a maximum are determined to be the acoustic propagation velocities of the earth formation for each of the different modes of propagation.

In a preferred embodiment of the invention, the step of comparing includes generating an object function of the difference between the synthesized signal and the received signal. The object function is minimized by the Levenberger-Marquardt algorithm to determine the values of velocity for each propagation mode.

DESCRIPTION OF THE PREFERRED EMBODIMENT

Figure 1:
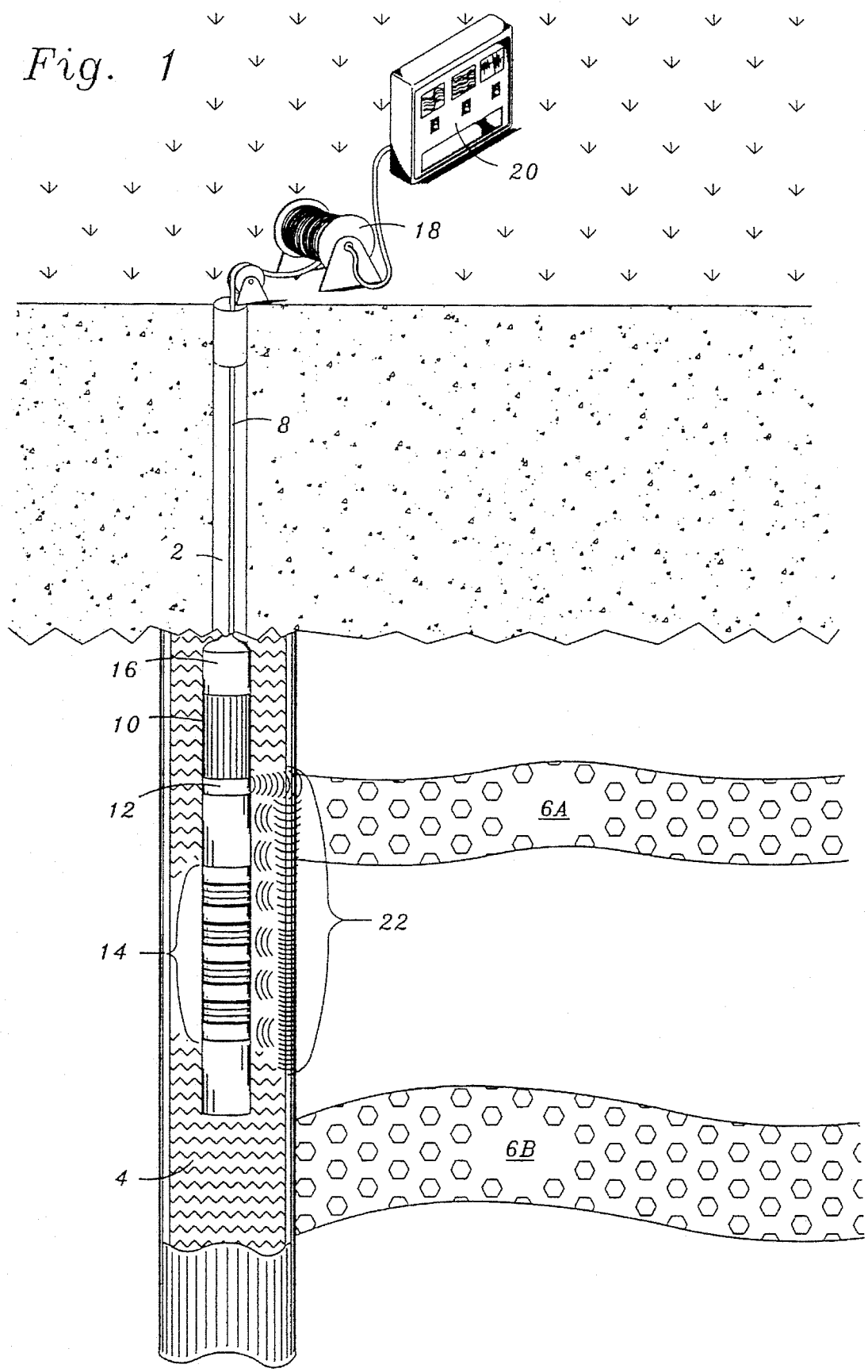
FIG. 1 shows an acoustic array wellbore logging tool disposed within as wellbore.

Operation of the present invention can be better understood by referring to FIG. 1. An acoustic array wellbore logging tool, shown generally at 10, is attached to one end of an armored electrical cable 8. The cable 8 is extended into a wellbore 2 penetrating earth formations, shown generally at 6A and 6B. A winch 18, or similar device known to those skilled in the art, extends the cable 8 into the wellbore 2. The wellbore 2 is typically filled with a liquid 4 which is known to those skilled in the art as "drilling mud", or similar fluid. The liquid 4 enables transmission of acoustic energy from the tool 10 outwardly to the wall of the wellbore 2.

As the tool 10 traverses the wellbore 2, an energy emitting acoustic transducer disposed on the tool 10, called a transmitter and shown generally at 12, periodically emits acoustic energy pulses. The pulses are shown generally at 22. The pulses 22 typically travel radially outwardly from the transmitter 12 through the fluid 4 in the wellbore 2, until they strike the wall of the wellbore 2. The pulses 22 then typically travel along the wellbore 4 wall. Some of the acoustic energy returns to the fluid 4 in the wellbore 2 and can be detected by a plurality of receiving transducers disposed at axially spaced apart locations from the transmitter 12, the receiving transducers being called receivers and shown generally at 14. The receivers 14 generate electrical signals corresponding to the amplitude of the acoustic energy reaching the receivers 14.

The tool 10 typically includes signal processing electronics, shown generally at 16, which can digitize the signals from the receivers 14 and impart the digitized signals to the cable 8. Signals imparted to the cable 8 can be transmitted to a surface electronics unit 20. The surface electronics unit 20 can include a computer (not shown separately for clarity) which can perform signal processing according to the present invention. Alternatively, the surface electronics 20 can generate a recording of the digitized signals. The recording can be processed later in another computer (not shown) according to the method of the present invention, which will be further explained.

It is to be understood that the method of signal processing according to the present invention is not limited to performance at any specific physical location. The choice of location for the computer (not shown) which performs the method of the present invention is only a matter of convenience for the system operator. For example, another computer (not shown) can be adapted to form part of the signal processing electronics 16 disposed within the tool 10 so that the method of the present invention can be performed within the tool 10 itself.

Figure 2C:
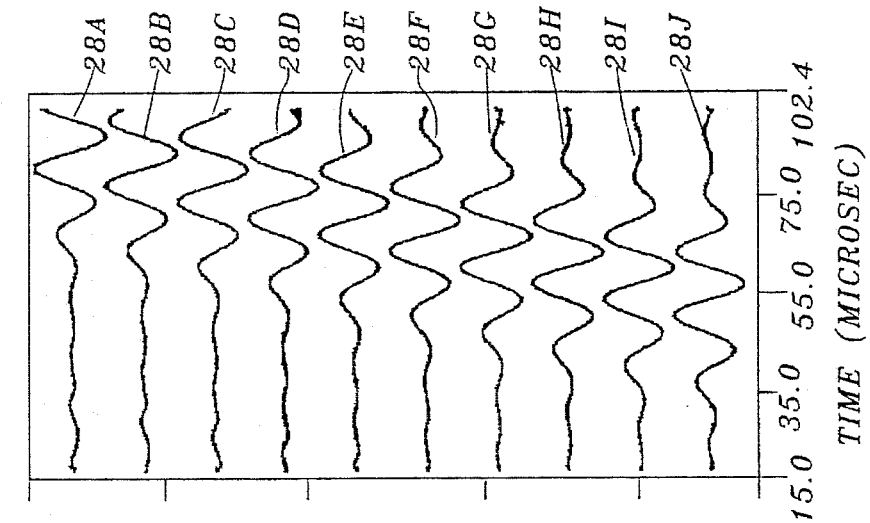
FIG. 2c shows a graph of signals generated by the receivers in response to tube waves.
Figure 2B:
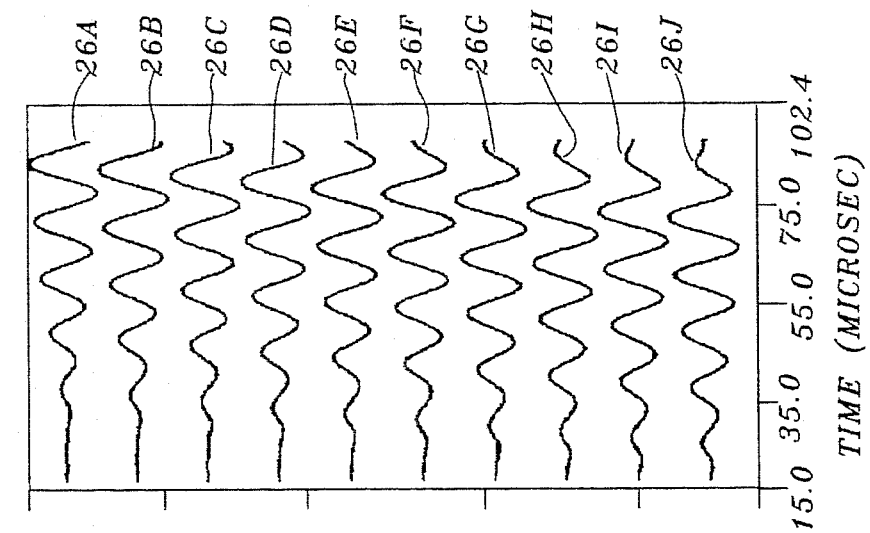
FIG. 2b shows a graph of signals generated by the receivers in response to flexural waves.
Figure 2A:
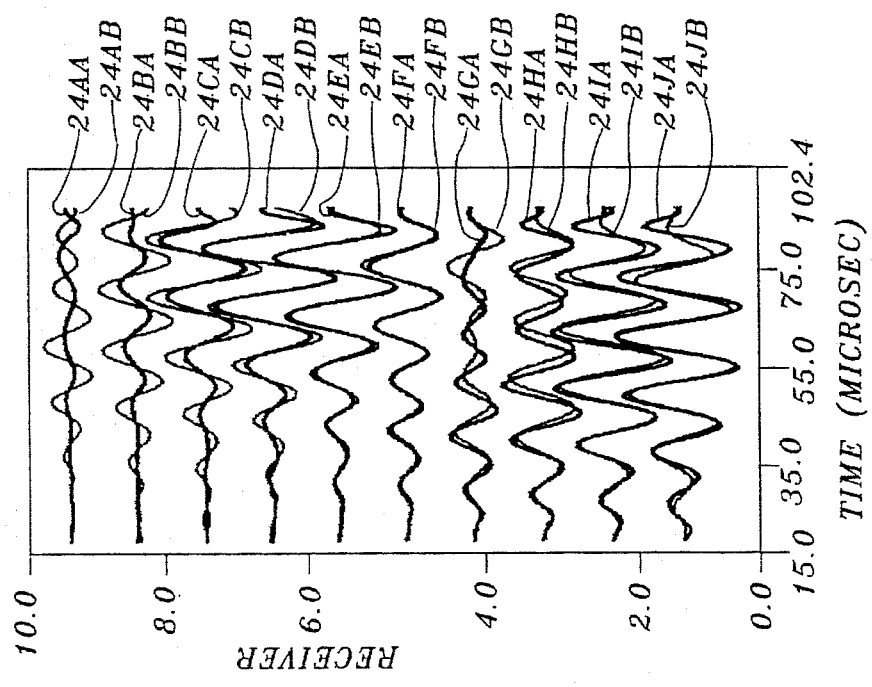
FIG. 2a shows a graph comparing signals synthesized according to the present invention with signals generated by receivers on an acoustic array logging tool.

The method of signal processing according to the present invention can be better understood by referring to FIG. 2a. FIG. 2a is a representation of receiver signals, shown generally at 24AA through 24JA, for ten individual receivers (such as those shown at 14 in FIG. 1) which are primarily responsive to acoustic energy in a so-called "dipole flexural" propagation mode. Receivers which are responsive primarily to acoustic energy propagating in flexural mode, called dipole receivers, are known in the art and are described, for example, in "Multipole Array Acoustilog", Atlas Wireline Services, Houston Tex., 1991.

The signals shown at 24AA through 24AJ in FIG. 2a represent signals generated in a laboratory test fixture (not shown) including a dipole transmitter and dipole receivers. The receivers in the laboratory fixture (not shown) used to generate the signals shown in FIGS. 2a, 2b and 2c are axially spaced apart from each other by a distance of 0.5 centimeters. As will be further explained, FIG. 2a further includes representations of synthesized receiver signals, shown generally at 24BA through 24BJ, the syntheses having been performed by the method of the present invention.

The signals shown at 24AA through 24JA in FIG. 2a can be composed of two differently propagating forms, or modes, of acoustic energy, which modes can be observed separately by referring to FIGS. 2b and 2c of FIG. 2. Graph (b) represents signals generated by acoustic energy propagating in the flexural mode, shown as 26A through 26J for each of the same receivers whose composite signals are shown in FIG. 2a. The signals in FIG. 2b were generated in the same laboratory test fixture (not shown) as the signals in FIG. 2a. As is understood by those skilled in the art, acoustic energy propagating in the flexural mode typically propagates substantially at the shear velocity of the earth formation (shown as 4 in FIG. 1).

FIG. 2c shows signals, shown generally at 28A through 28J, propagating as a so-called "tube" wave. The tube wave signals 28A through 28J were generated in the same laboratory fixture (not shown) as the signals represented in FIG. 2b. Tube waves propagate substantially at the compressional velocity of the fluid (shown as 4 in FIG. 1) in the wellbore (shown in FIG. 1 as 2), and as is understood by those skilled in the art, are typically present in wellbores in which a pipe or casing (not shown) has been coaxially inserted. Tube waves can also be induced by a transmitter (not shown in FIG. 2) which has non-flexural energy components, including compressional energy components, in its output. The signals shown in graph (a) as 24AA through 24AJ represent composite signals generated by combination of both modes, tube waves and flexural mode waves, of acoustic energy propagation which are shown separately in FIGS. 2b and 2c.

As can be observed by referring to FIGS. 2b and 2c, a velocity can be readily calculated when only one propagation mode is present in the signals by determining a time delay between corresponding signals at each receiver and dividing the time delay into the distance between the receivers, for example by using a method known in the art such as semblance correlation. The time delay between received signals is readily apparent by visual observation of signals such as 26A through 26J in FIG. 2b, as it is also apparent between signals such as 28A through 28J in FIG. 2c. Combination of two different propagation modes as represented by signals 24AA through 24AJ in graph (a) shows that a plurality of modes in the signals can cause interference which obscures the time delay apparent in the individual mode signals shown in FIGS. 2b and 2c.

The signal processing method of the present invention is related to the fact that the received, or measured, signal generated at each individual receiver (such as those shown at 14 in FIG. 1) in response to the acoustic energy, can be synthesized from a combination of measured signals from other receivers 14 on the tool (shown as 10 in FIG. 1). In the description of the embodiment presented herein, the measured signals from the other receivers 14 can include a quantity, designated by the variable p, of different acoustic energy propagation modes. The tool (shown in FIG. 1 as 10) can include a number of receivers, the number designated by the variable N. It is to be understood that the number of receivers 14 on the tool 10 is not a limitation of the present invention. The number of receivers 14 on the tool 10 needed to practice the method of the present invention need only be at least one greater than the number of propagation modes (p) present in the signals for which velocities are to be determined, as will be further explained.

As is understood by those skilled in the art, the signal actually measured by any particular receiver 14, that particular receiver 14 indicated by an index number n (where n is a number indicating the ordinal position of the particular receiver and is therefore in the range from 1 to N, N being the previously described total number of receivers 14 on the tool 10), the measured signal designated by the variable $W_n(\omega)$, can be synthesized by a combination of measured signals from other receivers 14 according to the following expression:

$$\overline{W}_n(\omega) = -\sum_{m=1}^{p} a_m(\omega) W_{(n-m)}(\omega) \tag{1}$$

where $\omega$ in equation (1) is the angular frequency. The overline designation above the $W_n(\omega)$ expression in equation (1) indicates that particular signal is a synthesized signal. The (n−m) subscript in equation (1) represents the individual receiver 14 having an ordinal position, or index number, equal to (n−m), which individual receiver 14 is the one spaced apart from the n receiver 14 by m receiver locations along the tool 10. Equation (1) further indicates that the measured signal at the n receiver must be synthesized by combining measured signals from a quantity of other measured signals from different receivers 14 at least equal in number to the number of propagation modes p in the synthesis. For example, if the synthesis were to include flexural and compressional modes, then measured signals from at least two other receivers 14 would need to be combined in order to synthesize the signal at the instant, or n, receiver 14.

The a coefficients of equation (1) are related to a characteristic equation, known to those skilled in the art, which determines the relative contribution of each of the propagation modes in the synthesized signal, the characteristic equation being:

$$z^p + a_1 z^{p-1} + \ldots + a_{p-1} z + a_p = 0 \tag{2}$$

where $z = e^{i\omega s d}$ and i is the square root of −1. s in equation (2) represents the inverse of acoustic velocity, hereinafter called "slowness", and d in equation (2) represents the axial spacing between the receivers 14 used to synthesize the signal at the instant receiver 14. In the present embodiment of the invention, all possible values of d consistent with the actual axial spacing of the receivers 14 on the tool 10 can be used in order to provide a high quality determination of the slowness corresponding to each propagation mode. In the tool 10 of the present invention, the receivers 14 can be axially spaced apart from each other by a distance of 0.5 feet. The axial spacing between receivers 14 is not a limitation of the present invention. The axial spacing only need be known in order to use the present invention.

In a novel aspect of the present invention, the a coefficients can be expressed in terms of the p—roots of equation (2) as shown herein:

$$a_1 = -\sum_{k=1}^{p} z_k$$

$$a_2 = \sum_{k,j=1}^{p} z_k z_j \quad (k<j)$$

$$a_3 = -\sum_{k,j,m=1}^{p} z_k z_j z_m \quad (k<j<m)$$

and on through the p-th expression:

$$a_p = (-1)^p z_1 z_2 z_3 \ldots z_p$$

By substituting into equation (1) the a coefficients calculated according to the preceding expressions, it is then possible to synthesize the signals in the time domain, rather than in the frequency domain as determined by equations (1) and (2), by choosing various values of slowness s for each of the p propagation modes that are to be included in the synthesized signal. The expression for time domain synthesis of the signal at the n-th receiver is:

$$\overline{W}_n(t) = \sum_{k=1}^{p} W_{n-1}(t - s_k d) - \sum_{k,j=1}^{p} W_{n-2}[t - (s_k + s_j)d] +$$

$$\sum_{k,j,m=1}^{p} W_{n-3}[t - (s_k + s_j + s_m)d] + \ldots -$$

$$(-1)^p W_{n-p}\left(t - \sum_{k=1}^{p} s_k d\right), \quad (k<j<m)$$

where $s_k$, $s_j$, $s_m$, are slowness values for each of the propagation modes included in the signal synthesis. It is possible, using the method of the present invention, to synthesize signals using measured signals from receivers located in either direction along the tool 10 from the instant receiver 14 by changing the sign of the time delay values calculated according to the products of slowness ($s_k$, $s_j$, $s_m$) and receiver spacing d in the preceding expression.

In the present embodiment of the invention, the process of synthesizing signals and comparing the synthesized signals with the measured signals can be repeated each receiver 14 on the tool 10. The differences in the synthesized signals and the measured signals for each receiver can be "summed" or "stacked" by methods known to those skilled on the art in order to improve the reliability of the slowness determination.

In the method of the present invention, the stacked differences between the synthesized signal the measured signal of the instant receiver can be used to perform an inversion by which the slowness s can be estimated. The estimation of slowness can begin by generating an object function. Object functions are known in the art and one version of object function can be calculated by the following expression:

$$E(s_1, s_2, \ldots s_p) = \sum_n \sum_t \|\overline{W}_n(t) - W_n(t, s_1, s_2, \ldots s_p)\|$$

Values of slowness s for each different propagation mode can be substituted into the expression for time domain synthesis of the signal. Initial values of slowness for each propagation mode in the synthesized signal can be selected from a range of values known to exist in typical earth formations (shown as 6A and 6B in FIG. 1) as is understood by those skilled in the art.

After the signal for the instant receiver is synthesized, the synthesized signal is compared with the measured signal for that receiver and the value of the object function is calculated. The process is repeated by substituting different values for the slowness, and the value of the object function is again determined. The value of slowness s for which the value of the object function is minimized is determined to be the slowness for that particular propagation mode. In the present embodiment of the invention a method for determining the minimum value of the object function can be the Levenberger-Marquardt algorithm, which is known to those skilled in the art. It is contemplated that other minimization methods known to those skilled in the art can be used to determine the value of slowness which generates a minimum value of the object function.

Referring back to FIG. 2a, as previously explained, includes both synthesized signals calculated according to the method of the present invention, and measured signals generated in response to acoustic energy propagating in the wellbore. The synthesized signals corresponding to each receiver are shown at 24AB through 24JB, and the measured signals are shown at 24AA through 24JA. Differences in signal amplitude between the synthesized signals and the measured signals results from the fact that the method of the present invention does not account for relative amplitudes of the signals at the various receivers. As can be observed in FIG. 2a, there is a high degree of correspondence between the measured signals 24AA—24JA and the signals 24BA—24BJ synthesized according to the method of the present invention when the values of slowness are correct for each propagation mode.

Those skilled in the art will be able to devise improvements to the present invention without departing from the spirit of the invention disclosed herein. The scope of the invention should be limited only by the claims appended hereto.

What is claimed is:

1. A method of determining acoustic velocity of an earth formation penetrated by a wellbore by processing signals from an array acoustic wellbore logging tool, said tool including a transmitter and a plurality of receivers axially spaced apart from said transmitter, said method comprising the steps of:

synthesizing a signal to correspond to a first one of said plurality of receivers, said step of synthesizing including time-shifting signals received at a second and a third one of said plurality of receivers in response to acoustic energy imparted to said earth formation by said transmitter, said time-shifting performed by an amount of time corresponding to a selected value of velocity for a selected propagation mode of said acoustic energy and an axial distance between said second one and said first one of said receivers and axial distance between said third one and said first one of said receivers, said step of synthesizing including summing said time-shifted signals;

comparing said synthesized signal to a signal generated by said first receiver in response to said acoustic energy propagated through said wellbore so as to determining a degree of correspondence between said synthesized signal and said generated signal;

varying said selected value of velocity, repeating said step of synthesizing signals and said step of comparing until said degree of correspondence reaches a maximum, thereby determining said acoustic velocity of said earth formation in said selected propagation mode.

2. The method as defined in claim 1 further comprising:

synthesizing said signals to correspond to said signals received by said first receiver by time-shifting and summing signals from n additional ones of said receivers, wherein n represents a number of additional selected propagation modes of said acoustic energy; and determining a velocity for each one of said additional propagation modes by determining said selected values of velocity for each of said propagation modes at which said degree of correspondence reaches a maximum.

3. The method as defined in claim 2 wherein said selected propagation modes comprise flexural mode, Stoneley mode and compressional mode.

4. The method as defined in claim 1 wherein said step of comparing comprises generating an object function of said difference between said generated signal at said first receiver and said synthesized signal.

5. The method as defined in claim 4 wherein said step of determining said values of velocity at which said degree of correspondence reaches a maximum comprises minimizing said object function by using a Levenberger-Marquardt algorithm.

6. A method for determining acoustic propagation velocities of an earth formation penetrated by a wellbore comprising the steps of:

inserting an acoustic array wellbore logging tool into said wellbore, said tool comprising at least one transmitter and a plurality of receivers axially spaced apart from said transmitter along said tool;

periodically actuating said transmitter to energize said earth formation with acoustic energy;

receiving signals at said plurality of receivers in response to said acoustic energy traversing said wellbore and said earth formation;

synthesizing a signal to correspond to a first one of said plurality of receivers, said step of synthesizing including time-shifting signals received at a second and a third one of said plurality of receivers in response to acoustic energy imparted to said earth formation by said transmitter, said time-shifting performed by an amount of time corresponding to a selected value of velocity for a selected propagation mode of acoustic energy and an axial distance between said second one and said first one of said receivers and an axial distance between said third one and said first one of said receivers, said step of synthesizing including summing said time shifted signals;

comparing said synthesized signal to a signal generated by said first receiver in response to said acoustic energy so as to determining a degree of correspondence between said synthesized signal and said generated signal;

varying said selected value of velocity, repeating said step of synthesizing signals and said step of comparing until said degree of correspondence reaches a maximum, thereby determining said acoustic velocity of said earth formation in said selected propagation mode.

7. The method as defined in claim 6 further comprising:

synthesizing said signals to correspond to said signals received by said first receiver by time-shifting and summing signals from n additional ones of said receivers, wherein n represents a number of additional selected propagation modes of said acoustic energy; and determining a velocity for each one of said additional propagation modes by determining said selected values of velocity for each of said propagation modes at which said degree of correspondence reaches a maximum.

8. The method as defined in claim 7 wherein said selected propagation modes comprise flexural mode, Stoneley mode and compressional mode.

9. The method as defined in claim 6 wherein said step of comparing comprises generating an object function of the difference between said generated signal and said synthesized signal.

10. The method as defined in claim 9 wherein said step of determining said values of velocity at which said degree of correspondence reaches a maximum comprises minimizing said object function by using a Levenberger-Marquardt algorithm.

* * * * *